(12) United States Patent (10) Patent No.: US 7,532,820 B2
Aronson (45) Date of Patent: May 12, 2009

(54) SYSTEMS AND METHODS FOR PROVIDING DIAGNOSTIC INFORMATION USING EDC TRANSCEIVERS

(75) Inventor: Lewis B. Aronson, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 569 days.

(21) Appl. No.: 11/082,520

(22) Filed: Mar. 17, 2005

(65) Prior Publication Data

US 2006/0093379 A1 May 4, 2006

Related U.S. Application Data

(60) Provisional application No. 60/623,356, filed on Oct. 29, 2004.

(51) Int. Cl.
*H04B 10/00* (2006.01)

(52) U.S. Cl. .......................... 398/135; 398/81; 398/138

(58) Field of Classification Search .................. 398/81, 398/92, 138, 208, 135, 139
See application file for complete search history.

(56) References Cited

U.S. PATENT DOCUMENTS

| | | | |
|---|---|---|---|
| 4,359,553 A | 11/1982 | Edwards | |
| 4,378,451 A | 3/1983 | Edwards | |
| 4,687,924 A | 8/1987 | Galvin et al. | |
| 4,734,914 A | 3/1988 | Yoshikawa | |
| 4,747,091 A | 5/1988 | Doi | |
| 4,809,286 A | 2/1989 | Kollanyi et al. | |
| 4,916,707 A | 4/1990 | Rosenkranz | |
| 4,932,038 A | 6/1990 | Windus | |
| 5,019,769 A | 5/1991 | Levinson | |
| 5,039,194 A | 8/1991 | Block et al. | |
| 5,041,491 A | 8/1991 | Turke et al. | |
| 5,268,949 A | 12/1993 | Watanabe et al. | |
| 5,287,375 A | 2/1994 | Fujimoto | |
| 5,334,826 A | 8/1994 | Sato et al. | |
| 5,383,208 A | 1/1995 | Queniat et al. | |

(Continued)

FOREIGN PATENT DOCUMENTS

EP 0580317 A1 1/1994

(Continued)

OTHER PUBLICATIONS

Yi Cai et al., "Jitter testing for gigabit serial communication transceivers," Jan.-Feb. 2002, IEEE Design and Test of Computers, vol. 19, Issue 1, pp. 66-74.

(Continued)

*Primary Examiner*—Dzung D Tran
(74) *Attorney, Agent, or Firm*—Workman Nydegger

(57) ABSTRACT

An optical transceiver is disclosed. The transceiver includes a receiver having adaptive electronic dispersion compensation (EDC) circuitry on at least one optical channel. The adaptive electronic dispersion compensation circuitry provides diagnostics information to a host system. The transceiver can be an XFP, X2, XENPAK, SFP, SFF, GBIC or other type of transceiver. The diagnostics information can include information on the time variation of a quality of the optical channel and/or a measure of a worst state of the optical channel over a period of time. The diagnostics information can also be derived from a measure of a quality of an equalized receiver signal, a current tap weight value, and many other specific values.

17 Claims, 2 Drawing Sheets

U.S. PATENT DOCUMENTS

| | | | |
|---|---|---|---|
| 5,392,273 A | 2/1995 | Masaki et al. | |
| 5,396,059 A | 3/1995 | Yeates | |
| 5,448,629 A | 9/1995 | Bosch et al. | |
| 5,516,563 A | 5/1996 | Schumann et al. | |
| 5,557,437 A | 9/1996 | Sakai et al. | |
| 5,574,435 A | 11/1996 | Mochizuki | |
| 5,576,877 A | 11/1996 | Aulet et al. | |
| 5,594,748 A | 1/1997 | Jabr | |
| 5,604,758 A | 2/1997 | AuYeung et al. | |
| 5,673,282 A | 9/1997 | Wurst | |
| 5,748,672 A | 5/1998 | Smith et al. | |
| 5,761,216 A | 6/1998 | Sotome et al. | |
| 5,801,866 A | 9/1998 | Chan et al. | |
| 5,812,572 A | 9/1998 | King et al. | |
| 5,854,704 A | 12/1998 | Grandpierre | |
| 5,926,303 A | 7/1999 | Giebel et al. | |
| 5,953,690 A | 9/1999 | Lemon et al. | |
| 5,956,168 A | 9/1999 | Levinson et al. | |
| 5,966,395 A | 10/1999 | Ikeda | |
| 6,016,379 A | 1/2000 | Bulow | |
| 6,055,252 A | 4/2000 | Zhang | |
| 6,064,501 A | 5/2000 | Roberts et al. | |
| 6,157,022 A | 12/2000 | Meada et al. | |
| 6,160,647 A | 12/2000 | Gilliland et al. | |
| 6,175,434 B1 | 1/2001 | Feng | |
| 6,188,059 B1 | 2/2001 | Nishlyama et al. | |
| 6,198,558 B1 | 3/2001 | Graves et al. | |
| 6,205,505 B1 | 3/2001 | Jau et al. | |
| 6,222,660 B1 | 4/2001 | Traa | |
| 6,229,788 B1 | 5/2001 | Graves et al. | |
| 6,256,127 B1 | 7/2001 | Taylor | |
| 6,292,497 B1 | 9/2001 | Nakano | |
| 6,313,459 B1 | 11/2001 | Hoffe et al. | |
| 6,423,963 B1 | 7/2002 | Wu | |
| 6,473,224 B2 | 10/2002 | Dugan et al. | |
| 6,512,617 B1 | 1/2003 | Tanji et al. | |
| 6,519,255 B1 | 2/2003 | Graves | |
| 6,526,076 B2 | 2/2003 | Cham et al. | |
| 6,560,255 B1 | 5/2003 | O'Brien et al. | |
| 6,570,149 B2 | 5/2003 | Maruyama et al. | |
| 6,594,050 B2 | 7/2003 | Jannson et al. | |
| 6,631,146 B2 | 10/2003 | Pontis et al. | |
| 6,643,472 B1 | 11/2003 | Sakamoto et al. | |
| 6,661,836 B1 | 12/2003 | Dalal et al. | |
| 6,694,462 B1 | 2/2004 | Reis et al. | |
| 6,748,181 B2 | 6/2004 | Miki et al. | |
| 6,763,025 B2 * | 7/2004 | Leatherbury et al. | 370/395.64 |
| 6,775,631 B2 | 8/2004 | Van Schyndel | 702/85 |
| 6,862,302 B2 | 3/2005 | Chieng et al. | |
| 6,937,949 B1 | 8/2005 | Fishman et al. | |
| 6,941,077 B2 | 9/2005 | Aronson et al. | |
| 6,952,531 B2 | 10/2005 | Aronson et al. | |
| 7,020,567 B2 | 3/2006 | Fishman et al. | |
| 7,026,700 B2 * | 4/2006 | Hanberg | 257/436 |
| 7,058,310 B2 | 6/2006 | Aronson et al. | |
| 7,134,796 B2 * | 11/2006 | Anderson | 385/88 |
| 7,190,742 B2 * | 3/2007 | Popescu et al. | 375/326 |
| 7,284,916 B2 * | 10/2007 | Sasser et al. | 385/92 |
| 2001/0046242 A1 | 11/2001 | Kawakami et al. | |
| 2001/0046243 A1 | 11/2001 | Schie | |
| 2002/0021468 A1 | 2/2002 | Kato et al. | |
| 2002/0027688 A1 | 3/2002 | Stephenson | |
| 2002/0060824 A1 | 5/2002 | Liou et al. | |
| 2002/0097468 A1 | 7/2002 | Mecherle et al. | |
| 2002/0101641 A1 | 8/2002 | Kurchuk | |
| 2002/0105982 A1 | 8/2002 | Chin et al. | |
| 2002/0105983 A1 | 8/2002 | Nomura | |
| 2002/0129379 A1 | 9/2002 | Levinson et al. | |
| 2002/0149821 A1 | 10/2002 | Aronson et al. | |
| 2002/0181519 A1 | 12/2002 | Vilhelmsson et al. | |
| 2002/0181894 A1 | 12/2002 | Gilliand et al. | |
| 2003/0053170 A1 | 3/2003 | Levinson et al. | |
| 2003/0110509 A1 | 6/2003 | Levinson et al. | |
| 2003/0113118 A1 | 6/2003 | Bartur | |
| 2003/0169790 A1 | 9/2003 | Chieng et al. | |
| 2003/0210917 A1 | 11/2003 | Stewart et al. | |
| 2004/0067066 A1 | 4/2004 | Uesaka | 398/194 |
| 2004/0076113 A1 | 4/2004 | Aronson et al. | |
| 2004/0120720 A1 | 6/2004 | Chang et al. | |
| 2004/0153913 A1 | 8/2004 | Fishman et al. | |
| 2004/0202210 A1 | 10/2004 | Thornton | |
| 2004/0240886 A1 | 12/2004 | Aronson et al. | |
| 2004/0253003 A1 | 12/2004 | Farmer et al. | |
| 2005/0031352 A1 | 2/2005 | Light et al. | |
| 2005/0058455 A1 | 3/2005 | Hosking et al. | |

FOREIGN PATENT DOCUMENTS

| | | |
|---|---|---|
| EP | 0745868 B1 | 4/2002 |
| EP | 0913896 B1 | 2/2004 |
| EP | 02704344 | 10/2004 |
| EP | 04017254 | 10/2004 |
| EP | 1471671 A2 | 12/2004 |
| JP | 58140175 | 8/1983 |
| JP | 62124576 A | 6/1987 |
| JP | 62235975 A | 10/1987 |
| JP | 62281485 A | 12/1987 |
| JP | 402102589 A | 4/1990 |
| JP | 404023373 A | 1/1992 |
| JP | 06209209 A | 7/1994 |
| JP | 09162811 A | 6/1997 |
| WO | WO 98/00893 | 1/1998 |
| WO | WO 98/00943 | 8/1998 |
| WO | PCT/US02/03226 | 5/2002 |
| WO | WO 02/063800 A1 | 8/2002 |
| WO | PCT/US2004/011130 | 10/2004 |
| WO | WO/2004/098100 | 11/2004 |

OTHER PUBLICATIONS

Maeda, Noriyuki "Notification of Reason(s) for Refusal," Japanese Patent Application No. JP2002-563630, Nakamura, M. et al., Jul. 13, 2005.

Finisar Corp., "App. Note AN-2025: Using the Finisar GBIC I²C Test Diagnostics Port," 1998.

Hausdorf, Reiner, "Mobile Transceiver Measurements with Radiocommunication Service Monitor CMS," News from Rohde & Schwarz, 127, IV, 1989, pp. 4-7.

Webopedia: The 7 Layers of the OSI Model [online] [retrieved Oct. 15, 2003]. Retrieved from Internet: URL: http://webopedia.internet.com/quick_ref/OSI_Layers.asp.

Webopedia.com: Public-Key Encryption [online] [retrieved Oct. 15, 2003]. Retrieved from Internet: URL: http://www.webopedia.com/TERM/p/public_key_cryptography.html.

Webopedia.com: MAC Address [online] [retrieved Oct. 15, 2003]. Retrieved from Internet: URL: http://www.webopedia.com/TERM/M/MAC_address.html.

Webopedia.com: I2C [online] [retrieved Nov. 11, 2003]. Retrieved from Internet: URL: http://www.webopedia.com/TERM/I/I2C.html.

Manchester Encoding [online] [retrieved Nov. 12, 2003]. Retrieved from Internet: URL: http://www.erg.abdn.ac.uk/users/gorry/course/phy-pages/man.html.

Documentation entitled "IR Receiver ASSP: T2525", copyright 2003 by Atmel Corporation.

Documentation entitled "IR Receiver for Data Communication: U2538B", copyright 2003 by Atmel Corporation.

Documentation entitled "Low-Voltage Highly Selective IR Receiver IC: T2527", copyright 2002 by Atmel Corporation.

Documentation entitled "Application Note: T2525/26/27", copyright 2003 by Atmel Corporation.

*LXT16706/16707 SerDes Chipset*, Intel Products, www.intel.com/design/network/products/optical/phys/1xt16706.htm, Apr. 19, 2002.

*LXT35401 XAUI-to-Quad 3.2G Transceiver*, Intel Products, www.intel.com/design/network/products/optical/phys/lxt35401.htm, Apr. 19, 2002.

Texas Instruments User's Guide, *TLK2201 Serdes EVM Kit Setup and Usage*, Mixed Signal DSP Solutions, Jul. 2000.

Texas Instruments User's Guide, *TLK1501 Serdes EVM Kit Setup and Usage*, Mixed Signal Products, Jun. 2000.

National Semiconductor DS92LV16 Design Guide, *Serializing Made Simple*, Feb. 2002.

Vaishali Semiconductor, *Fibre Channel Transceiver*, VN16117, MDSN-0002-02, Aug. 9, 2001.

Fairchild Semiconductor, Application Note 77, *CMOS, the Ideal Logic Family*, Jan. 1983.

Analog Target Specification, Annex 48B, Published by IEEE New York, May 2001, pp. 6-14.

*Optiport SFF BiDi-Transceiver 100 Mbit/s, 1310 nm Tx/1550 nm Rx*, Infineon Technologies, Jun. 22, 2004, pp. 1-14.

Kirkpatrick, P. et al., "10Gb/s Optical Transceivers: Fundamentals and Emerging Technologies," Intel Technology Journal, vol. 8, Issue 2, May 10, 2004, pp. 83-97.

Willcocks, B. et al., "Electronic Dispersion Compensation Steps up to 10-Gbit/s Link Challenges," CommsDesign, Jan. 14, 2004, pp. 1-5.

PCT/US2005/037935, Mail Date Oct. 2, 2006, Written Opinion of the International Searching Authority.

JP2007539007, Mail Date Sep. 24, 2008, Notification of Reasons for Rejections.

* cited by examiner

SYSTEMS AND METHODS FOR PROVIDING DIAGNOSTIC INFORMATION USING EDC TRANSCEIVERS

CROSS REFERENCE TO RELATED APPLICATIONS

This application claims priority to U.S. Provisional Patent Application Ser. No. 60/623,356, filed on Oct. 29, 2004, and entitled "Diagnostic Functions for Use With EDC Transceivers", which is incorporated herein by reference in its entirety.

BACKGROUND OF THE INVENTION

1. The Field of the Invention

The present invention relates generally to the field of fiber optic transceivers and their use and particularly to transceivers incorporating electronic equalizers for electronic dispersion compensation (EDC).

2. The Relevant Technology

As fiber optic transmission systems are pushed to higher data rates and longer transmission distances, they are often limited by one or another form of optical dispersion where there is a velocity spread in the components of the signal. This velocity spread tends to spread the optical pulses in time, which causes the pulses that make up the 0's and 1's of most transmission systems to spread into one another, leading to an impairment known as inter-symbol interference (ISI). As ISI increases, it will eventually destroy any clear distinction in the level of a 0 or a 1 (also known as closing the optical eye), which is the basis that most simple detection systems use to make an error free decision.

The use of electronic equalizers, very common in many other fields, such as radio transmission, copper based high speed electronic links, and disk drive read circuits, is now finding applications in optical transmission systems, where they can be used in optical receivers to successfully detect signals which are otherwise unusable in simple receivers. The operation of electronic equalizers can be based on a number of techniques, such as the use of filters that combine the signal with itself at different delays and with different weights. Sometimes, the signal after a decision element, is fed back, again with different delays and weights, and combined with the signal from a first equalizer (known as decision feedback equalization or DFE). A key element of an EDC link is a system by which the tap weights are set in order to achieve a successful determination of the original signal.

EDC is now starting to be used in at least two important applications in fiber optic transmissions. The first is to extend the distances over which high speed links based on Electroabsorption modulators can operate. These systems' maximum link distance is critically dependent on properties of the devices known as their wavelength chirp, which tend to be difficult to control beyond a certain point. It has been shown that EDC techniques can greatly increase the yield of such systems at their normal limits (say for 80 km transmission at 10 Gb/s), or to reach distances normally impractical for unequalized systems (say achieving 120 km at 10 Gb/s). Longer distances in these systems are of great commercial value as they either eliminate the need for expensive optical amplifiers and their support infrastructure, or reduce the number of amplifiers needed in a given application.

The second application, currently being standardized in the Institute for Electrical and Electronics Engineers (IEEE) for use in 10 Gb/s Ethernet, is the extension of the distance over which 10 Gb/s data can be transmitted on legacy multimode fiber. For the most common grade of presently installed multimode fiber, normal techniques generally do not achieve transmission distances beyond 100 m, whereas the most interesting use of these links require transmission distances of at least 220 m with a strong preference for 300 m. In the case of multimode fiber, link distances are limited by modal dispersion, that is, the differences in the effective velocity of the different fiber modes caused by imperfections in the index profiles of the fibers. Depending on the degree of these imperfections, EDC techniques can often be used to achieve the desired distance of 300 m. However, it appears that an important fraction of these fibers may have imperfections that are so great that they cannot be equalized with practical EDC techniques.

It is generally easy to determine when an EDC or other receiver has exceeded its limitations to detect data accurately, as the host system can determine whether errors have occurred by a variety of techniques. In the case of multimode fiber applications, this information might be used to switch to another fiber with better modal dispersion characteristics. However, this ignores another practical issue: link reliability. For every system beyond the failure point, there are likely to be a similar or larger number of links just below the failure point which may easily fail later due to any number of small changes to the link, such as temperature induced changes of transmitter power, receiver sensitivity or changes in the fiber modal dispersion due to manipulation of the fiber links. Systems on the edge of failure are highly undesirable, and information on whether a system has adequate margin would be very valuable for avoiding this problem.

There are currently a number of ways in which diagnostic information concerning the various operating parameters of a fiber optic system can be collected. In one application, diagnostic information about aspects of the transceiver operation such as received and transmitted power, temperature and the like, is provided from a fiber optic transceiver to a host system.

With attention now to FIG. 1, details are provided concerning a typical optical transceiver module 1. The optical transceiver module 1, also referred to herein as a "transceiver," or "transceiver module," includes a receiver optical subassembly (ROSA) 2 and an associated post amplifier 4. Transceiver module 1 also includes a transmitter optical subassembly (TOSA) 3 and an associated laser driver 5. The post amplifier 3 and the laser driver 5 are integrated circuits (IC) that communicate the high speed electrical signals to a host or other device.

In the illustrated implementation however, all other control and setup functions are implemented with a third single-chip integrated circuit 10 referred to as the controller IC. Exemplary embodiments of a controller IC are disclosed and claimed in U.S. patent application Ser. No. 09/777,917, entitled Integrated Memory Mapped Controller Circuit for Fiber Optics Transceiver, filed Feb. 5, 2001, which is incorporated herein by reference in its entirety.

The controller IC 10, or simply "controller", communicates with and controls the postamp 4 and laser driver 5. Data lines 21 and 9 connect the postamp 4 to the controller 10, while data lines 7, 8, and 20 connect the laser driver 5 to the controller 10. An additional feedback signal line 6 can connect the ROSA 2 to the controller 10.

The controller 10 also handles all low speed communications with the end user. These low speed communications concern, among other things, the standardized pin functions such as a Loss of Signal (LOS) 14, a Transmitter Fault Indication (TX FAULT) 13, and the Transmitter Disable Input (TX DISABLE) 12, also sometimes referred to as "TXD." The LOS indicator 14 is set to assert a digital signal when the received power at the transceiver falls below a predetermined limit indicating that it is likely that the received data is not usable.

The controller 10 can also have a two wire serial interface that, among other things, accesses memory mapped locations in the controller. The two wire serial interface of the controller 10 can be coupled to host device interface input/output lines, typically clock line 15 (SCL) and data line 16 (SDA). In at least one embodiment, the two wire serial interface operates in accordance with the two wire serial interface standard that is also used in the GBIC ,SFP and XFP transceiver standards, however other serial interfaces could equally well be used in alternate embodiments. Among other things, the two wire serial interface is used for all setup and querying of the controller 10, and enables access to the optoelectronic transceiver control circuitry as a memory mapped device.

During normal operation, the laser driver 5 receives differential transmission signals TX+ and TX− from differential transmission terminals 11, and condition the differential signals for proper optical transmission using TOSA 3. Also, the Postamp 4 outputs differential receive signals RX+ and RX− on differential receive terminals 17 based on optical signals received by ROSA 2. The transceiver 1 also has voltage supplies such as, for example, Vcc provided on terminal 19, and ground provided on terminal 18.

In a somewhat more elaborate system, such as a 2×10 small form factor transceiver, dedicated output pins provide analog voltage outputs proportional to signals of interest, such as the present bias current of the transceiver's laser diode. These may be used to detect problems such as the approach of failure for the device. (See, for example, the Revised Small Form Factor Multisource Agreement (SFF MSA), dated Jul. 5, 2000.)

More sophisticated systems use serial communication links to transmit more detailed diagnostic information in a more convenient digital format. FIG. 2 shows a serial communications interface, in this case a 2 wire serial interface known as I$^2$C, on pins 15 and 16, which are often used to communicate diagnostics information. These systems fall into two general categories. The first is a command-based system where the host provides a query command for a particular piece of information, and the transceiver provides the data using a predetermined protocol. As an example, this system is used as part of the 300-pin transceiver standard contained in the Multi-Source Agreement (MSA) "I2C Reference Document for 300 Pin MSA 10 G and 40 G Transponder", dated Aug. 4, 2003.

A second technique, and one that has become more commonly employed, is known as a memory mapped diagnostics system. In this system, various pieces of diagnostic information are provided in predetermined address locations as if they were stored in a permanent memory. The host system queries this memory address and reads the diagnostics data that is presently stored there by the transceiver. This system evolved from earlier transceivers that used an Electrically Erasable Programmable Read Only Memory (EEPROM) device to store and provide static identification information on the transceiver (such as the link types it supports or it's serial number) to the host system. One example of a memory mapped diagnostics system can be found in the Digital Diagnostic Monitoring Interface for Optical Transceivers, SFF document number: SFF-8472, rev. 9.5, Jun. 1, 2004, which is incorporated herein by reference in its entirety.

These two types of systems commonly use one of two protocols to communicate this information. The first is known as Management Data Input/Output (MDIO) that is used widely in IEEE standards and in the XENPAK, X2 and related optical transceivers. Copies of these standards can be found on the world wide web at: http://www.xenpak.org/MSA/XENPAK_MSA_R3.0.pdf, and http://www.x2msa.org/X2_MSA_Rev2.pdf. The second protocol, which is more widely used, is known as I2C (sometimes written as I$^2$C) which is used on many control and diagnostics systems ranging from memories to various sensor systems. I2C for digital diagnostics is now used in GigaBit Interface Converters (GBICs), SFF, SFP and XFP transceivers (as defined by the MSA). I2C is used for EEPROM communications in all GBICs.

Finally, there are sometimes EDC diagnostics on the integrated circuit (IC) level. Diagnostic information on the state of EDCs is often provided at the level of the IC that implements the EDC function. This information in existing designs often consists of the values of the tap weights of the various equalizer elements. Parallel, analog, or digital lines either provide this, or these lines may be multiplexed to single outputs. Alternatively, this data can be read out through a standard serial interface similar to those described above. An EDC circuit is illustrated in FIG. 2, with a serial interface for communicating the values of tap weights. Another example of prior art EDC diagnostics on the integrated circuit level is the use of circuitry which evaluates the quality of the equalized signal often referred to as measuring the eye quality.

BRIEF SUMMARY OF THE EMBODIMENTS OF THE INVENTION

Thus, there is a need to provide a practical means by which the operating margin of an EDC enabled fiber optic link is determined and communicated to a host system. It is the object of the present invention to provide this diagnostic data from an EDC enabled transceiver to a host system using various possible systems and methods, as well as to describe various methods by which the host system can use this data to improve system reliability.

Exemplary embodiments of the present invention describe several methods by which a transceiver can provide diagnostic information to a host system on the state of the EDC system and how that information can be used by the host system to determine how close a link is to its failure point. The exemplary embodiments relate to the use of information derived from adaptive equalization circuitry in a fiber optic transceiver to provide diagnostics information on the quality of an optical channel.

In a fiber optic transceiver with adaptive equalization circuitry, the equalization circuitry compensates for impairments on the fiber optic link. In so doing, the circuitry makes use of algorithms to determine parameters for elements of the equalization circuitry such as tap weights in a feed-forward equalizer. The resulting parameters are thus a function of the quality of the optical link and can be provided directly to a host system, where they can be evaluated by various methods. Alternatively, the transceiver's control circuitry can derive and provide various metrics of the quality of the optical link from the equalizer parameters. Such information is of great use to a host system in determining whether the quality of a link is adequate to allow reliable transmission performance.

In addition to absolute metrics of the quality of the optical link, the fiber optic transceiver described above can provide diagnostics information on how close the quality of the fiber optic link is to the performance limit of its receiver. This information can be derived by comparing the derived link quality to the known performance limits of the transceiver. Alternately, in one embodiment, this information can be derived by comparing the states of the equalizer parameters to the adaptation limits of those same parameters in the given circuit. In a related manner, the quality of the optical link can be determined by circuitry which evaluates the quality of the electrical signal after the signal is fed through the equalizer circuitry.

In one embodiment, a microcontroller or similar device in the transceiver calculates a metric of the quality of the optical link. This value can then be provided as an analog voltage on an output pin to a host system.

In another embodiment, the calculated metric of the optical link quality is compared to a predetermined limit, and the results of that comparison are provided through a digital output pin in much the same way as an optical loss-of-signal pin indicates that the received power is less than a predetermined limit. In a closely related embodiment, the same comparison is made by directly comparing the state of the equalizer circuitry to the known limits of the equalizer circuitry capability. Similarly, a digital output pin can be configured to indicate that the optical link is beyond the performance capability of the equalizer circuitry, and thus it is likely that the resulting error rate on the link is unacceptable.

As an alternative or in addition to a digital output pin, a transceiver can provide the above indications using an indicator light. This embodiment may be particularly useful as it would allow an operator to select a fiber optic connection which provides adequate link quality for successful transmission.

In yet another embodiment, the optical transceiver provides the diagnostics information using a serial communications link. In this case, the interface to the diagnostics information can be of several types, including a memory mapped interface where the information is accessed by reading from predetermined memory locations, a register based interface where the information is located at specified register locations, and a command interface where the host provides a command indicating the information it wants and then retrieves the information using a predetermined protocol.

In the embodiments where a serial communications interface is used, many types and forms of information can be provided. For example, alarm and warning flags can be provided indicating that the optical link quality is closer than a predetermined measure from the limit of the equalizer's performance, or that the link quality is worse than the limit of what the equalizer can compensate for.

One useful form of diagnostics information is a metric of the optical link quality. There are several such metrics, including the power penalty that would be incurred using an ideal linear equalizer or an ideal decision feedback equalizer. A transceiver with a serial communications interface can provide one or more of these metrics, again derived from the state of the equalizer circuitry, as digital values. A more complete description of the optical channel can be derived from the state of the equalizer circuitry. This description can be represented as an impulse response in the time domain or as a frequency response function. Either of these descriptions can be provided to the host through a serial communications interface as a set of digital values.

Some communications equipment and fiber optic transceivers are designed to be capable of transmitting at more than one data rate. Examples of this are Ethernet connections that can configure themselves to operate at 10, 100 or 1000 Megabits per second, as well as Fibre Channel systems which can operate at 1.06, 2.125 or 4.25 Gigabits/second. These systems are often capable of automatically negotiating the maximum usable data rate on a link based on the capability of the system on each side of the link.

In the case of systems which may have performance limitations due to link dispersion, the diagnostics functions described herein can be used to determine if the link quality is the limiting factor in the maximum data rate and to select a data rate accordingly. In particular, the fiber optic transceiver can provide diagnostic information that directly indicates the maximum data rate that it can support on the link. Finally, the fiber optic transceiver can provide direct information on the state of the equalizer circuitry through a serial interface, such as via a readout of equalizer tap rates.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EMBODIMENTS

Figure 1:
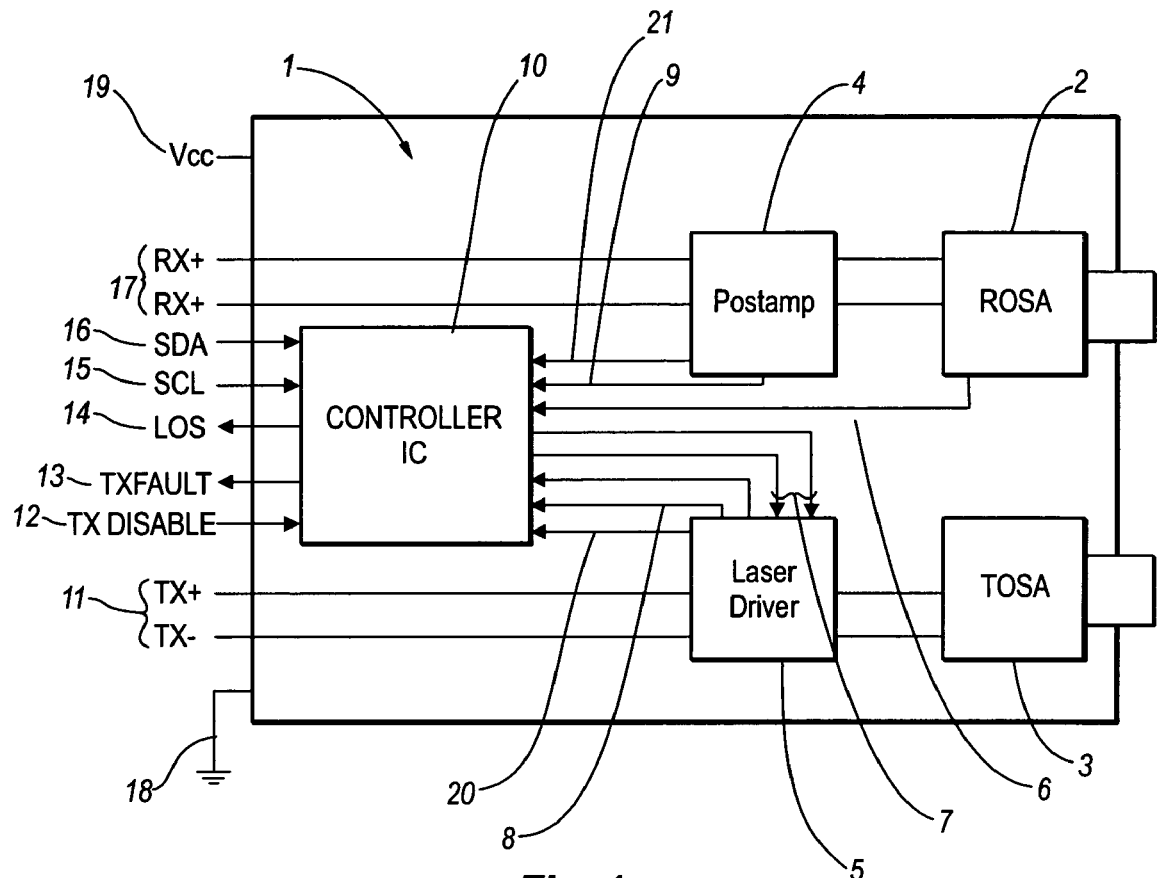
FIG. 1 is a schematic illustration of a prior art transceiver module.
Figure 2:
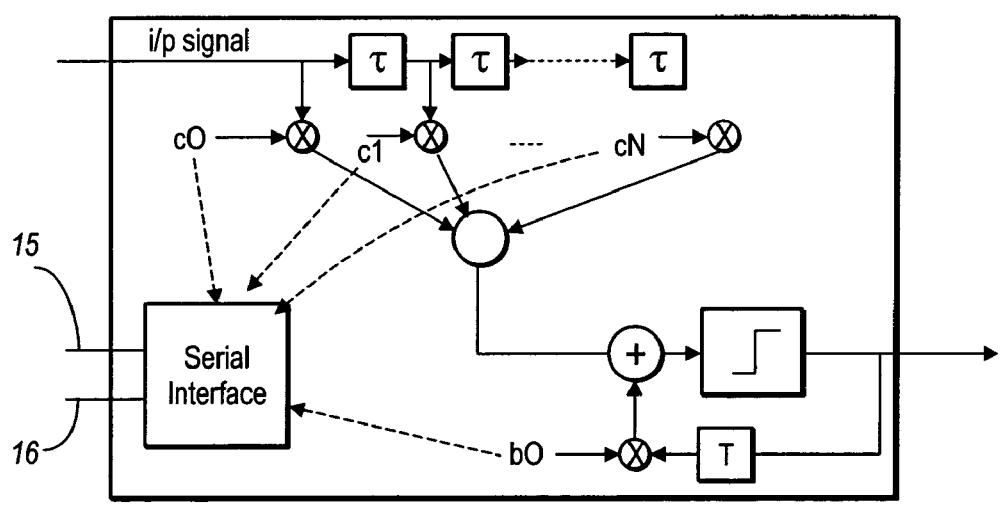
FIG. 2 illustrates a portion of the data flow through an electronic dispersion compensation integrated circuit having a diagnostics output in accordance with the prior art.
Figure 3:
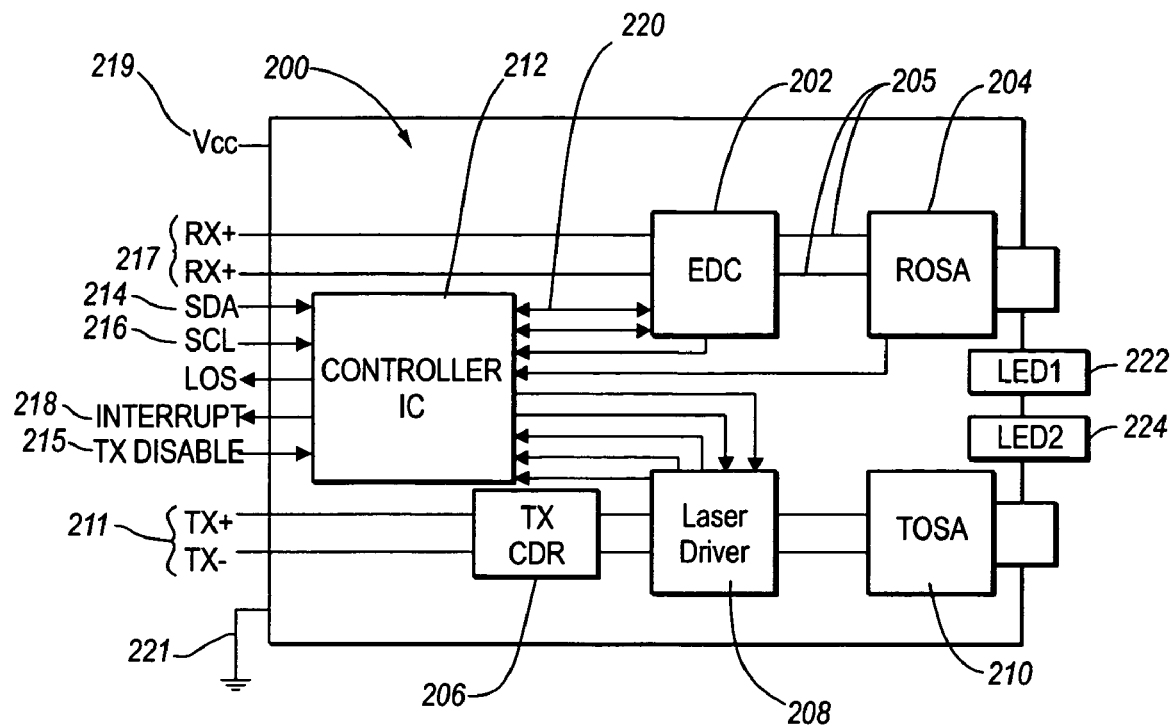
FIG. 3 is a schematic illustration of a transceiver module according to one embodiment of the present invention.

In one embodiment of the present invention, a schematic diagram of a transceiver 200 is shown in FIG. 3. In this example, the transceiver 200 is of the XFP form factor, and is designed to support enhanced transmission over multimode fiber using an electronic dispersion compensation (EDC) integrated circuit (IC) 202 connected to a receiver optical subassembly (ROSA) 204 in the receive path via data lines 205. The ROSA 204 can incorporate a linear response transimpedance amplifier (TIA-not shown) which is desirable to provide a usable signal to the EDC circuitry. A limiting amplifier of the type commonly used in unequalized links will destroy much of the information the EDC circuitry relies on to recover the transmitted signal. The transmit path of the transceiver consists of a transmit Clock Data Recovery (CDR) 206, a laser driver 208 and a transmitter optical subassembly (TOSA) 210. During normal operation, the CDR 206 can receive differential transmission signals TX+ and TX− from differential transmission terminals 211, and transmit the signals to the laser driver 208, which can condition the differential signals for proper optical transmission using TOSA 210.

The EDC IC 202 in this case, also incorporates the retiming function for the receive path, so no external receive CDR is required. The EDC IC 202 can generate differential receive output signals RX+ and RX− on differential receive terminals 217 based on optical signals received by ROSA 204. The transceiver 200 can also have voltage supplies such as, for example, Vcc provided on terminal 219, and ground provided on terminal 221.

The transceiver 200 also contains a microcontroller 212, which is used for a number of functions. These include setup, control and temperature compensation of various elements of the transmit and receive paths, and implementation of diagnostics functions. In this embodiment, the microcontroller 212 is further connected to the host system through a 2 wire serial interface that includes a clock line 216 (SCL) and data line 214 (SDA). Additionally, an interrupt pin, 218, as defined in the XFP MSA standard, can also be connected to the host system.

The microcontroller 212 can also handle all low speed communications with the end user. These low speed communications concern, among other things, the standardized pin functions such as a Loss of Signal (LOS) 213, and the Transmitter Disable Input (TX DISABLE) 215, also sometimes referred to as "TXD." The LOS indicator 213 is set to assert a digital signal when the received power at the transceiver falls below a predetermined limit indicating that it is likely that the received data is not usable.

In this embodiment, the microcontroller 212 is connected by a serial data path 220 to the EDC IC 202. The EDC IC 202 is designed such that the current state of the EDC equalizer tap weights can be reported on this serial connection 220 as digital values. In this embodiment, the microcontroller 212 can then perform a number of calculations with this data. In the simplest form, one calculation compares the tap weights with the known limits of those values for this EDC IC 202, and determines how close the IC 202 is to the limits of its equalization capability. The resulting value is then compared to preset thresholds. If the tap weights are beyond a given point corresponding to inadequate margin, then the transceiver 200 will set a warning flag, which would be accessible to the host in a predefined memory location, analogous to other such flags defined in the XFP MSA.

Further, the microcontroller 212 would set an interrupt to alert the host system of the warning condition. Effectively, this warning would be an indication that the overall fiber link is too close to the limits of equalization. This information could be used by the host system for a variety of purposes. First, the host system could inform the operator of the system (through the host system operating system or a front panel indication) to choose a different multimode fiber connection (presumably done at system setup). Second, the host system could inform the operator to choose a different optical launching technique. For example, in a transceiver designed with a single mode output connection, an operator could first attempt to make a useable connection directly to the multimode fiber (simplest, lowest cost). However, if the connection is inadequate, the operator could add a mode conditioning patchcord, for example, as referenced in the IEEE 802.3z standard for 1000 Base-LX. Finally, the host system could automatically switch the link to a lower transmission rate (e.g., from 8 Gb/s to 4 Gb/s) where the link would have much more margin.

Other diagnostics functions can be provided in the embodiment described above. For example, an alarm flag and associated interrupt could be set if the EDC tap weights indicate that the link is beyond the limits of the EDC IC (for example, if a number of tap weights were set at their maximum possible value). Finally, the IC could directly provide the data on the tap weights to the host system.

As an alternative or additional function, the microcontroller 212 could calculate a metric of the optical channel quality from the tap weights or other parameters of the equalizer state. One useful example of such a metric is the power penalty for an ideal decision feedback equalizer (PIE-D) or an ideal linear equalizer. In the exemplary embodiment, the value of this metric could be provided to the host at a predetermined memory location (i.e. a memory mapped location). Alternately, this information could be provided to a register and accessed by a register based interface. In still other alternative embodiments, the information can be accessed through a command interface. As is done for other values in prior art digital diagnostics implementations, the transceiver could also provide limit values for the above metric corresponding to warning and alarm flag levels.

Figure 4:
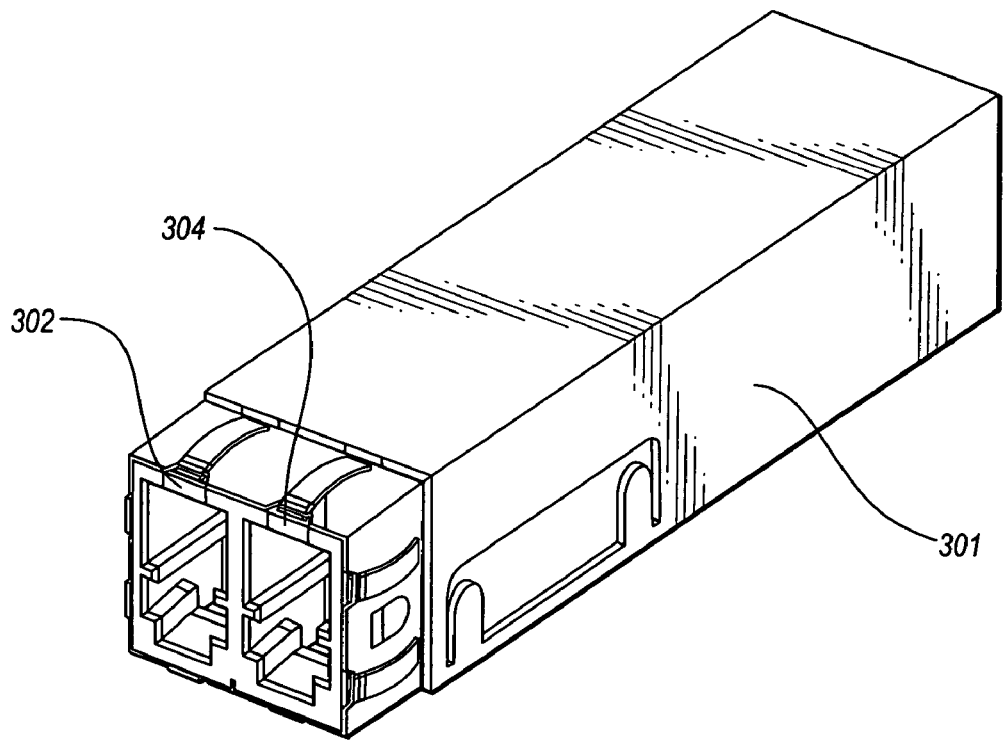
FIG. 4 illustrates a perspective view of one example of a transceiver module according to one embodiment of the present invention.

As an alternate embodiment or an additional feature, the transceiver could have one or more indicator lights on the visible front surface. These are indicated as 222 and 224 in FIG. 3. The microcontroller 212 could activate these lights 222, 224 to indicate the above mentioned warning or alarm states. These indicator lights could be LEDs mounted on the front surface, or light pipes which channel lights from LEDs mounted on a PCB within the transceiver. One alternate embodiment of the indicator lights is illustrated in FIG. 4, which shows a module 301 having indicators 302 and 304.

In other alternate embodiments, the diagnostics information can include information on the time variation of a quality of the optical channel. Alternately, the diagnostics information can include a measure of the worst state of the channel over a period of time. The diagnostics information could also be derived from a measure of a quality of the equalized received signal. In still other embodiments, the diagnostics information could further include a digital representation of the impulse response of the optical channel. Still further embodiments could include a digital representation of the frequency response of the optical channel. In other alternate embodiments, the diagnostics information can include the maximum usable data rate on the connected channel. Those skilled in the art will realize that many other specific data measurements could be utilized, either alone or in combination with the specific examples provided above. The specific embodiments illustrated here are for the purpose of illustration only, and are not meant to limit the invention in any way.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Additionally, with respect to any document incorporated by reference in this application, in any case of conflicting data or standards, the information contained in this specification shall be deemed to have priority.

What is claimed is:

1. An optical transceiver comprising;
an optical receiver configured to convert a received optical signal on at least one optical channel into a corresponding electrical signal;
an optical transmitter configured to convert electrical signals into a corresponding optical signal;
a driver circuit coupled to the optical transmitter and configured to provide said electrical signals to the optical transmitter;
a controller integrated circuit in communication with the driver circuit;
electronic dispersion compensation (EDC) circuitry in communication with the controller circuit and configured to perform the following when receiving the corresponding electrical signals from the optical receiver:

an act of performing electronic dispersion compensation on the corresponding electrical signal received from the optical receiver; and an act of generating diagnostics information concerning the electronic dispersion compensation; and a communication mechanism configured to provide at least some of the diagnostics information generated by the EDC circuitry to a host interface, wherein the optical receiver, optical transmitter, driver circuit, EDC circuitry, and controller integrated circuit are integrated into the same transceiver housing.

2. The optical transceiver of claim 1, wherein the optical transceiver is any one of a XFP, X2, XENPAK, SFP, SFF and GBIC transceiver.

3. The optical transceiver of claim 1 wherein the transceiver further comprises a clock and data recovery circuitry (CDR) configured to receive an electrical signal from a host device and to provide said electrical signal to the driver circuit, wherein the CDR circuitry is integrated into the same transceiver housing as the driver circuit.

4. The optical transceiver of claim 1, wherein said controller integrated circuit comprises said communication mechanism.

5. The optical transceiver of claim 4, wherein said controller integrated circuit communicates with said host device using a serial interface.

6. The optical transceiver of claim 1, wherein said diagnostics information includes at least one of the following:
 i) an indication that a state of said adaptive EDC circuitry is closer than a predetermined measure from a limit of its capability to achieve a desired level of receiver performance;
 ii) a measure of how close a state of said adaptive EDC circuitry is to a known limit of its capability;
 iii) an indication that said adaptive EDC circuitry is unable to achieve a desired level of receiver performance;
 iv) a digital representation of a metric of a quality of said optical channel;
 v) a digital representation of an impulse response of said optical channel;
 vi) a digital representation of a frequency response of said optical channel;
 vii) information on a time variation of a quality of the optical channel;
 viii) a measure of a worst state of said optical channel over a period of time;
 ix) a maximum usable data rate possible on said optical channel;
 x) link performance data for the optical channel;
 xi) information derived from a current tap weight value in an adaptive equalizer; and
 xii) information derived from a measure of a quality of an equalized received signal.

7. The optical transceiver of claim 6, wherein said diagnostics information is provided using at least one of an analog voltage on an output pin, a digital output pin, a warning flag, and an indicator light on the transceiver.

8. The optical transceiver of claim 6, wherein said diagnostics information can be accessed by at least one of a memory mapped interface, a register based interface, and a command interface.

9. The optical transceiver of claim 6, wherein said metric is one of a power penalty of an ideal linear equalizer and a power penalty of an ideal decision feedback equalizer.

10. The optical transceiver of claim 6, wherein said maximum usable data rate is selected from a set of standardized link data rates.

11. An optical transceiver comprising an optical receiver configured to convert a received optical signal on at least one optical channel into a corresponding electrical signal, the transceiver further comprising electronic dispersion compensation (EDC) circuitry configured to receive the corresponding electrical signals, a method for providing diagnostics information to a host system, the method comprising the steps of:
 performing electronic dispersion compensation on the corresponding electrical signal received from the optical receiver;
 generating diagnostics information concerning the electronic dispersion compensation;
 providing said diagnostics information to the host; and
 using said diagnostics information to determine whether a given fiber optic connection is usable;
 wherein said diagnostics information includes at least one of the following:
  i) an indication that a state of said adaptive EDC circuitry is closer than a predetermined measure from a limit of its capability to achieve a desired level of receiver performance;
  ii) a measure of how close a state of said adaptive EDC circuitry is to a known limit of its capability;
  iii) an indication that said adaptive EDC circuitry is unable to achieve a desired level of receiver performance;
  iv) a digital representation of a metric of a quality of said optical channel;
  v) a digital representation of an impulse response of said optical channel;
  vi) a digital representation of a frequency response of said optical channel;
  vii) information on a time variation of a quality of the optical channel;
  viii) a measure of a worst state of said optical channel over a period of time;
  ix) a maximum usable data rate possible on said optical channel;
  x) link performance data for the optical channel;
  xi) information derived from a current tap weight value in an adaptive equalizer; and
  xii) information derived from a measure of a quality of an equalized received signal.

12. The method of claim 11, wherein, if said determining step finds that said given fiber optic connection is not usable, further comprising a step for:
 having an operator switch to a different fiber optic connection; and
 repeating said determining step until a usable fiber optic connection is identified.

13. The method of claim 12, wherein the host system alerts said operator to a result of said determining step.

14. An optical transceiver comprising an optical receiver configured to convert a received optical signal on at least one optical channel into a corresponding electrical signal, the transceiver further comprising electronic dispersion compensation (EDC) circuitry configured to receive the corresponding electrical signals, a method for providing diagnostics information to a host system, the method comprising the steps of:
 performing electronic dispersion compensation on the corresponding electrical signal received from the optical receiver;
 generating diagnostics information concerning the electronic dispersion compensation; and
 providing said diagnostics information to the host;

wherein the diagnostics information comprises at least a link performance parameter of an current optical launch adapter and further comprising steps for:

comparing said link performance parameter to a predefined value;

using said diagnostics information to choose an alternative optical launch adapter;

wherein said diagnostics information includes at least one of the following:

i) an indication that a state of said adaptive EDC circuitry is closer than a predetermined measure from a limit of its capability to achieve a desired level of receiver performance;

ii) a measure of how close a state of said adaptive EDC circuitry is to a known limit of its capability;

iii) an indication that said adaptive EDC circuitry is unable to achieve a desired level of receiver performance;

iv) a digital representation of a metric of a quality of said optical channel;

v) a digital representation of an impulse response of said optical channel;

vi) a digital representation of a frequency response of said optical channel;

vii) information on a time variation of a quality of the optical channel;

viii) a measure of a worst state of said optical channel over a period of time;

ix) a maximum usable data rate possible on said optical channel;

x) link performance data for the optical channel;

xi) information derived from a current tap weight value in an adaptive equalizer; and xii) information derived from a measure of a quality of an equalized received signal.

15. The method of claim 14, wherein, if said performance parameter does not meet said predefined value, further comprising steps for:

having an operator switch to a different launch adapter; and
repeating said comparing step until said performance parameter meets or exceeds said predefined value.

16. An optical transceiver comprising an optical receiver configured to convert a received optical signal on at least one optical channel into a corresponding electrical signal, the transceiver further comprising electronic dispersion compensation (EDC) circuitry configured to receive the corresponding electrical signals, a method for providing diagnostics information to a host system, the method comprising the steps of:

performing electronic dispersion compensation on the corresponding electrical signal received from the optical receiver;

generating diagnostics information concerning the electronic dispersion compensation;

providing said diagnostics information to the host;

wherein said diagnostics information includes at least one of the following:

i) an indication that a state of said adaptive EDC circuitry is closer than a predetermined measure from a limit of its capability to achieve a desired level of receiver performance;

ii) a measure of how close a state of said adaptive EDC circuitry is to a known limit of its capability;

iii) an indication that said adaptive EDC circuitry is unable to achieve a desired level of receiver performance;

iv) a digital representation of a metric of a quality of said optical channel;

v) a digital representation of an impulse response of said optical channel;

vi) a digital representation of a frequency response of said optical channel;

vii) information on a time variation of a quality of the optical channel;

viii) a measure of a worst state of said optical channel over a period of time;

ix) a maximum usable data rate possible on said optical channel;

x) link performance data for the optical channel;

xi) information derived from a current tap weight value in an adaptive equalizer; and xii) information derived from a measure of a quality of an equalized received signal; and further comprising the step of decreasing said data rate until said maximum usable data rate is determined.

17. method of claim 16, wherein said data rate is decreased by selecting from a set of rates which differ from each other by factors of two.

* * * * *

UNITED STATES PATENT AND TRADEMARK OFFICE
CERTIFICATE OF CORRECTION

| | | |
|---|---|---|
| PATENT NO. | : 7,532,820 B2 | Page 1 of 2 |
| APPLICATION NO. | : 11/082520 | |
| DATED | : May 12, 2009 | |
| INVENTOR(S) | : Aronson | |

It is certified that error appears in the above-identified patent and that said Letters Patent is hereby corrected as shown below:

Drawings
Sheet 2, replace Figure 3 with the figure depicted below, wherein the reference number --213-- has been inserted

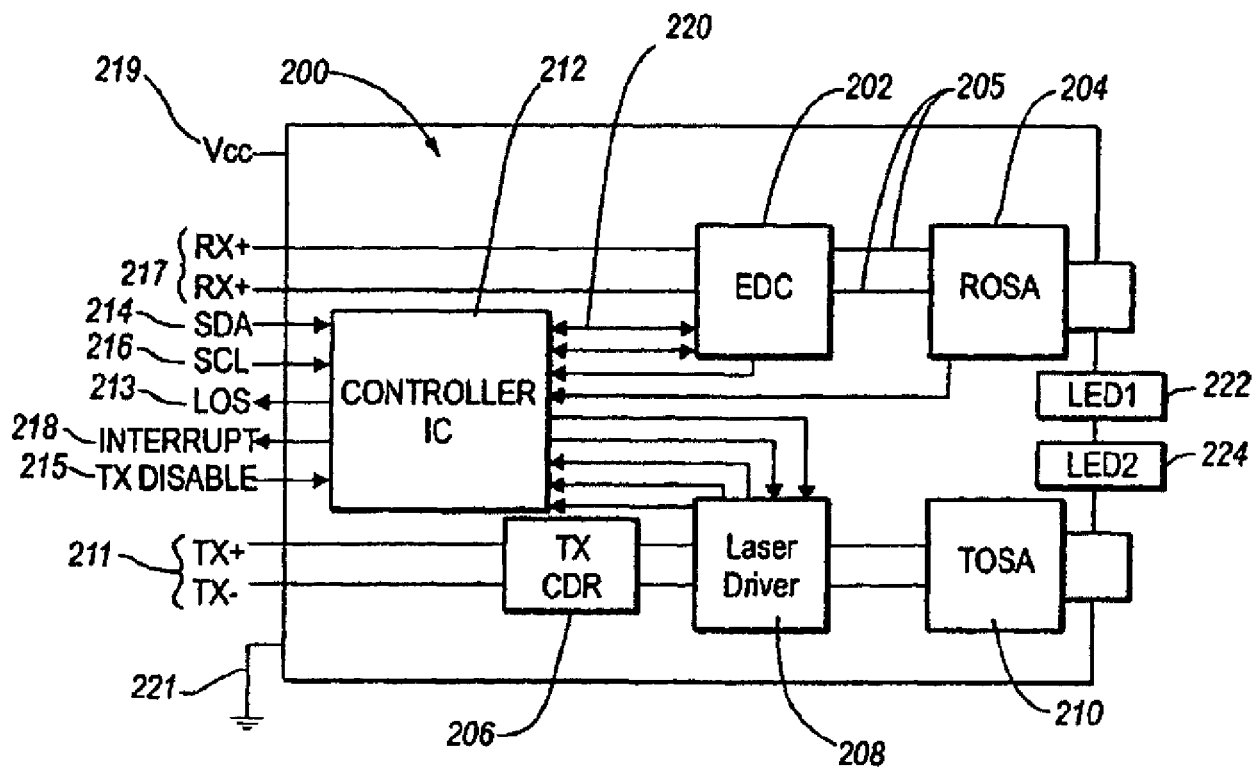

Fig. 3

Signed and Sealed this
Twenty-second Day of February, 2011

David J. Kappos
*Director of the United States Patent and Trademark Office*

CERTIFICATE OF CORRECTION (continued)
U.S. Pat. No. 7,532,820 B2

Column 3
Line 19, change "condition" to --conditions--
Line 37, change "2" to --two--
Line 58, change "it's" to --its--

Column 7
Line 6, change "2" to --two--

Column 11
Line 2, change "an" to --a--